United States Patent

Westermann

[15] 3,663,136
[45] May 16, 1972

[54] APPARATUS FOR AUTOMATICALLY MAKING PHONOGRAPH RECORDS

[72] Inventor: William S. Westermann, 1400 Burton Valley Rd., Nashville, Tenn.

[22] Filed: Apr. 1, 1970

[21] Appl. No.: 24,624

[52] U.S. Cl. ........................... 425/116, 425/128, 425/186, 425/126, 425/327, 425/290, 425/438, 425/150, 425/160, 425/455
[51] Int. Cl. ........................................ B29d 17/00
[58] Field of Search ........................ 18/5.3 P, 5.3 R

[56] References Cited

UNITED STATES PATENTS

| | | | |
|---|---|---|---|
| 2,743,478 | 5/1956 | Harlow et al. | 18/5.3 P |
| 3,329,997 | 7/1967 | Rand et al. | 18/5.3 P |
| 3,412,427 | 11/1968 | Flusfeder et al. | 18/5.3 P |
| 3,526,690 | 9/1970 | Bachman | 18/5.3 P X |
| 3,528,127 | 9/1970 | Damm et al. | 18/5.3 P |
| 3,186,029 | 6/1965 | Joseph | 18/5.3 P |
| 3,514,813 | 6/1970 | Westermann | 18/5.3 P |

Primary Examiner—J. Howard Flint, Jr.
Attorney—Harrington A. Lackey

[57] ABSTRACT

An apparatus for loading and unloading a record press, including means for preforming the mass of plastic record material, transferring the upper and lower record labels from label magazines or supply stacks and positioning the upper label above the mass and the lower label below the mass. The apparatus further includes means for compressing the labels and mass into a composite unit upon a load carrier, moving the carrier between the pressing dies, ejecting the composite unit upon the dies, removing the completed record from the pressing dies to an unloading station, punching the center hole in the record, trimming the flashing from the record, and removing the record to a deposit station.

This apparatus also includes a single plastic extruder, and duplicates of all the above record processing elements for simultaneously and automatically processing and finishing two records at a time in cooperation with a record press.

7 Claims, 21 Drawing Figures

INVENTOR:
WILLIAM S. WESTERMANN
BY
Harrington A. Lockey
ATTORNEY

APPARATUS FOR AUTOMATICALLY MAKING PHONOGRAPH RECORDS

BACKGROUND OF THE INVENTION

This invention relates to an apparatus for making a phonograph record, and more particularly to an apparatus for making one or two phonograph records automatically.

Record presses having upper and lower dies adapted to be moved together for pressing a record from a plastic material sandwiched between the upper and lower labels are, of course, well-known in the art.

Heretofore, record presses have been manually loaded and unloaded. That is, the mass of plastic material to make a single record is manually measured, preformed and sandwiched between the upper and lower labels, and centered on the lower die to be automatically compressed between the upper and lower dies of the record press. After the record is formed, it is manually removed from the press and still subject to additional finishing operations before the record is ready for distribution. The flashing, or excess marginal plastic material, must be trimmed from the record and a spindle hole punched through the center of the record.

Although certain mechanical devices have been developed or used, with various degrees of success, for accomplishing some of the above-mentioned steps in the processing of a phonograph record, nevertheless it is not believed that an apparatus has been developed which is completely automatic to produce one, much less two, phonograph records simultaneously from a single plastic extruder, and in which several of the process steps are performed simultaneously.

SUMMARY OF THE INVENTION

This invention is for an apparatus for making a complete phonograph record, and particularly two phonograph records simultaneously from a single extruder mechanism.

Generally, the apparatus includes a loading system and an unloading system for an existing or conventional record press. The loading system includes mechanism for simultaneously molding two masses of plastic material adapted to be used in the making of each record, positioning the upper and lower labels above and below the respective plastic masses, compressing the masses and the labels into a composite unit upon a load carrier. The load carrier is reciprocably moved between the loading station and the pressing station where the composite unit is deposited between the die presses.

The unloading system includes a record holder adapted to engage the flashing of the record as it is pressed and transfer the completed record from the press to an unloading station. A center hole is punched through the record, the flashing trimmed from the record, and the finished record removed from the loading station and transferred to a deposit station.

Several of the steps are performed simultaneously, such as the compression of the plastic mass and labels upon the load carrier; the transfer of the upper and lower labels from their supply stacks to label positioning elements; and the p ressing of a record by the dies.

Furthermore, certain of the finishing operations, such as punching the center hole in the record, is performed simultaneously with the depositing of a composite unit of plastic and labels upon the dies of the record press.

DESCRIPTION OF THE PREFERRED EMBODIMENT

Figure 2:
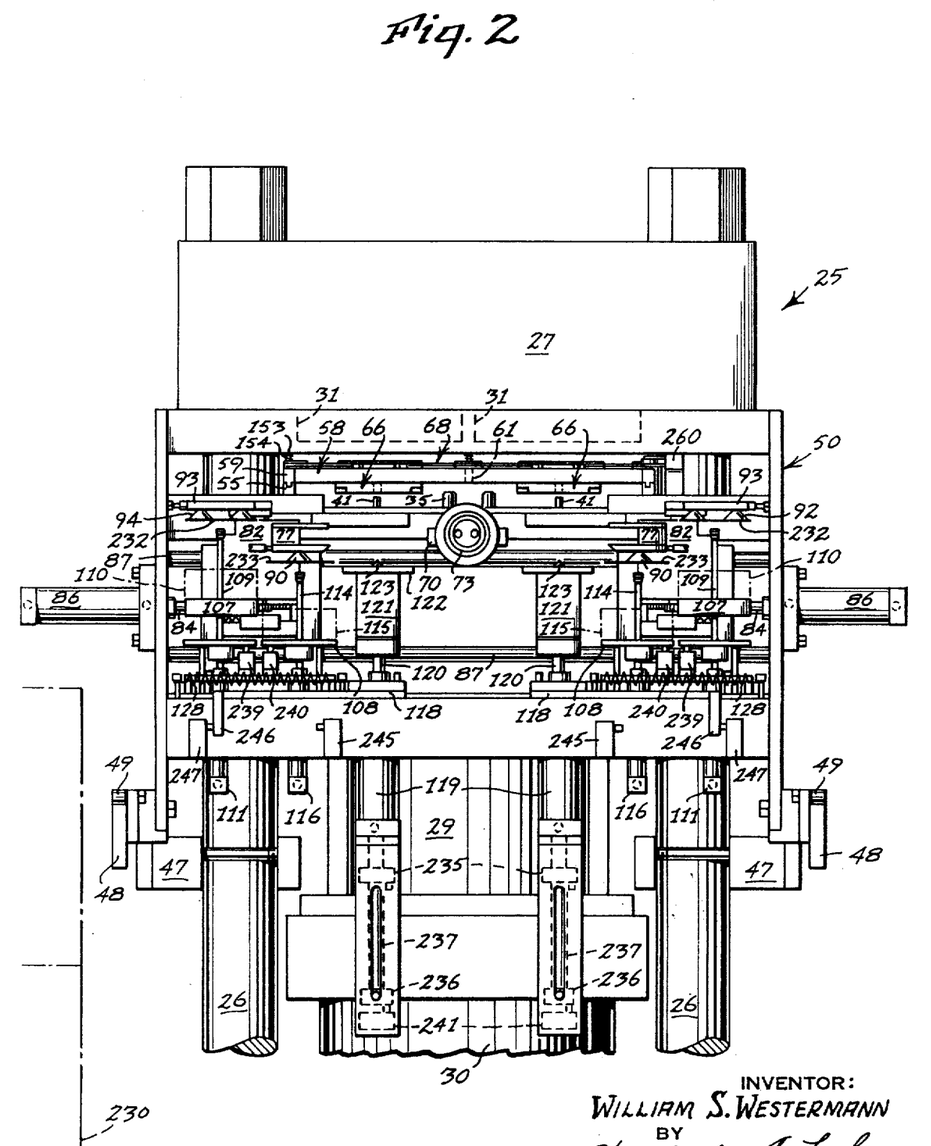
FIG. 2 is a front end elevation of the apparatus disclosed in FIG. 1, that is, as viewed from the left end of FIG. 1, with most of the extruder removed and with bottom portions broken away.

The apparatus 25 made in accordance with this invention includes four vertical stationary support posts 26, to the top of which are affixed the upper press head 27. The lower press head 28 is slidably mounted upon the posts 26 and is adapted to be raised and lowered by the hydraulic ram 29. The ram 29 vertically reciprocates within the hydraulic cylinder 30 (FIG. 2). Opposing each other on the respective press heads 27 and 28 are a pair of upper platens 31 and a corresponding pair of lower platens 32. An upper record die 33 is fitted on the bottom surface of each upper platen 31, while the mating lower record die 34 is fitted on the top surface of each lower platen 32, in a conventional manner. Studs 35 project upwardly from the lower platen 32 to register with corresponding holes or recesses 36 in the upper platen 31.

Since most of the elements in the apparatus 25 are duplicate mirror-images about the longitudinal center line, extending from front to rear, only one of each duplicate element will be described.

Figures 7, 8, 9, 10, 11, 14, 15:
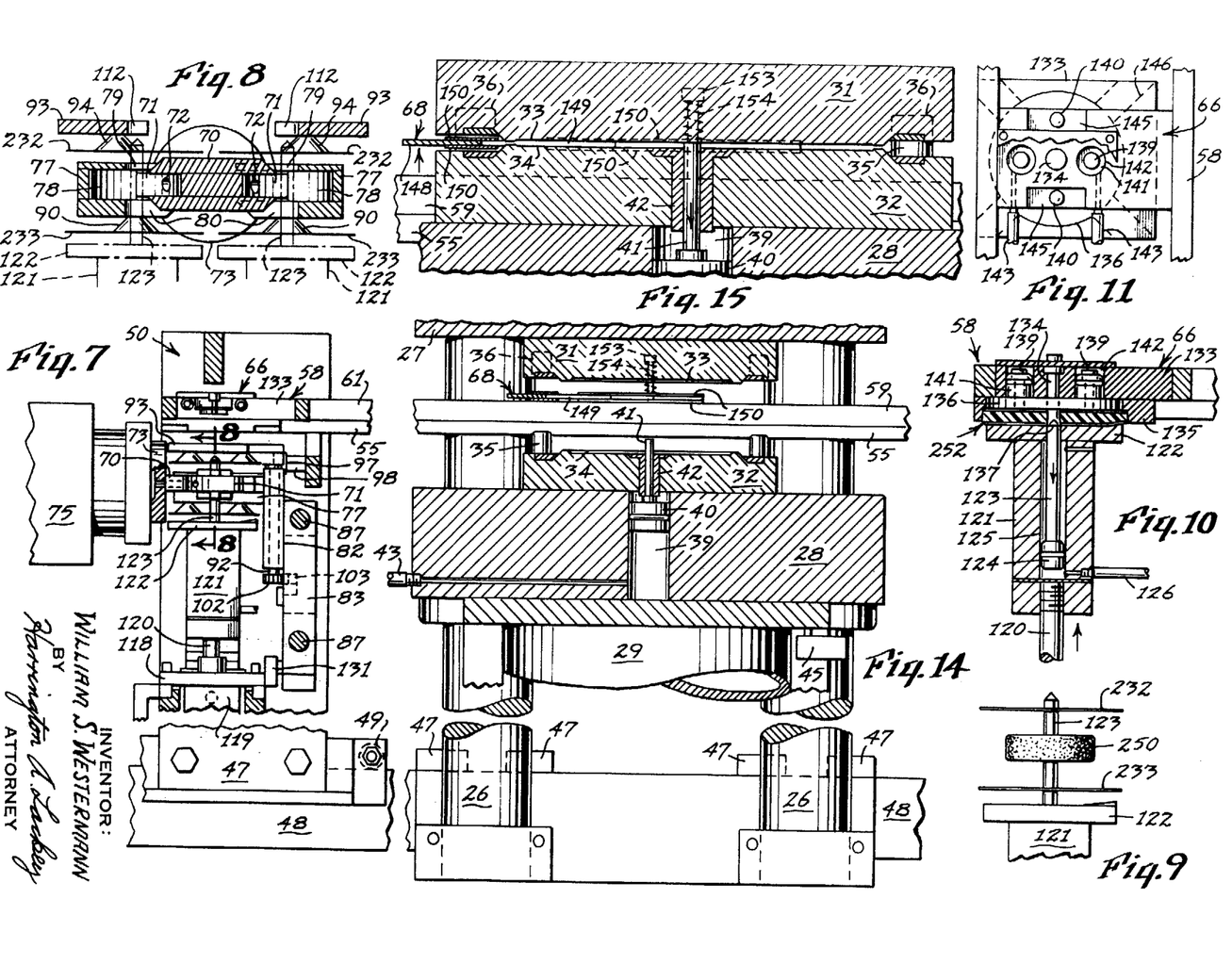
FIG. 7 is a fragmentary sectional elevation taken along the line 7—7 of FIG. 5.
FIG. 8 is an enlarged fragmentary section taken along the line 8—8 of FIG. 7, disclosing the molds and holding pins in molding positions.
FIG. 9 is a fragmentary elevation of the compression plate and the projecting holding pin supporting the molded mass of plastic record material and the upper and lower labels, preparatory to compression.
FIG. 10 is an enlarged section taken along the line 10—10 of FIG. 3, illustrating the compression of the plastic mass to form the composite unit upon the load carrier.
FIG. 11 is a fragmentary top plan view of the load carrier disclosed in FIG. 10.
FIG. 14 is an enlarged, fragmentary section taken along the line 14—14 of FIG. 1.
FIG. 15 is an enlarged, fragmentary sectional elevation of the record holder at the loading station, disclosing the dies compressed.

Formed in the lower press head 28 is a cylindrical air chamber 39 reciprocably receiving a piston 40 carrying the center pin 41 adapted to reciprocate through the vertical sleeve 42 in the lower platen 32 and through a corresponding center hole in the lower die 34 (FIG. 14). The chamber 39 is supplied with air through the conduit 43 below the piston 40.

A limit switch 45 is fixed in a stationary position on a convenient portion of the apparatus 25 to be engaged and actuated by the lower press head 28 in its lowermost inoperative, or nonpressing, position.

Fixed to the posts 26 by brackets 47 on both sides of the apparatus 25 are a pair of elongated rails 48 extending from front to rear of the apparatus 25.

The imaginary vertical column formed by the loci of the various positions of the upper and lower record dies 33 and 34 during their reciprocable movement toward and away from each other will hereinafter be referred to generally as the pressing station.

Mounted upon the rails 48 in the front portion of the apparatus 25 by means of rollers 49 is the loading frame 50. The rollers 49 are provided to render the loading frame 50 movable to facilitate maintenance of the apparatus. That is, when the apparatus is inoperative, and the dies 33 and 34 need changing, or some other maintenance is required at the pressing station, the loading frame 50 may be moved forward away from the press heads 27 and 28.

In a similar manner, the unloading assembly frame 52 is provided with rollers 53 for rolling reciprocable movement along the rails 48 in the rear portion of the apparatus 25, that is, to the rear of the press heads 27 and 28.

Longitudinally spanning both pressing stations, and holding in relatively fixed operative positions the loading frame and the unloading frame 52, are a pair of carrier rails or tracks 55 and 56. Mounted to move longitudinally and reciprocably of the apparatus 25 is the carrier frame 58, including parallel slide bars 59 and 60 cooperatively engaging the tracks 55 and 56, and a draw bar 61. The rear end of the draw bar 61 is linked by coupling 62 to piston rod 63 reciprocably actuated by pneumatic cylinder 64 stationarily mounted upon the rear end of the unloader frame 52.

The carrier tracks 55 and 56 extend longitudinally between the upper and lower press heads 27 and 28, but just outside the outer edges of the dual platens 31 and 32.

Figure 1:
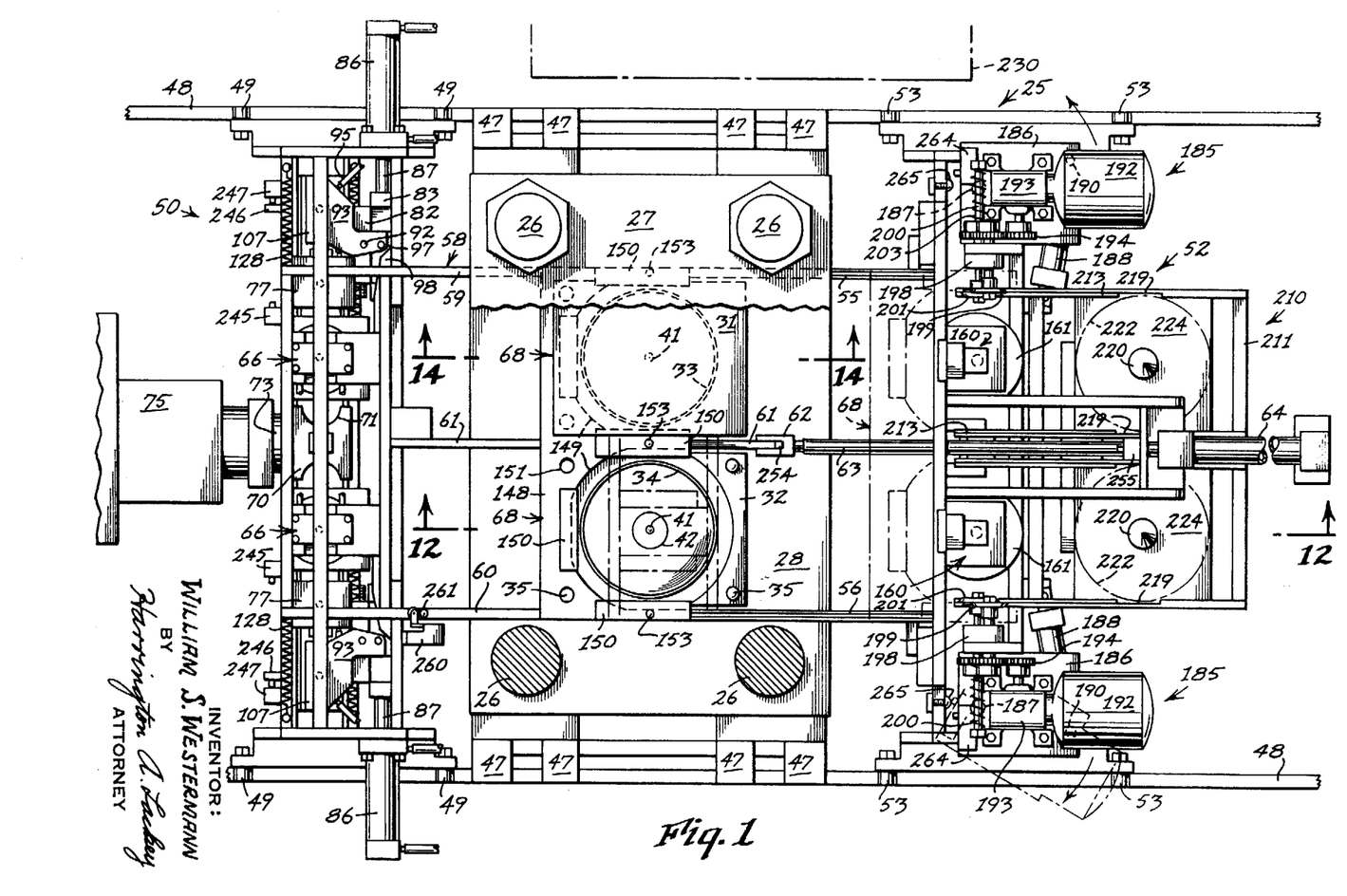
FIG. 1 is a top plan view of the apparatus made in accordance with this invention, with portions broken away, and with the carrier frame in its protracted position.

Mounted on the front end portion of the carrier frame 58 is a load carrier 66 in longitudinal alignment with the center of the record dies 33 and 34. FIG. 1 shows the load carrier 66 in its protracted, or forwardmost, position, which will be hereinafter referred to as the loading station.

Also mounted upon the carrier frame 58 is a record holder 68, spanning the entire width of the carrier frame 58 and shown in operative position at the pressing station (FIG. 1). The record holder 68 is also shown in phantom position at the unloading station to the rear of the pressing station, in FIG. 1.

Fixed in the upper portion of the center of the loader frame 50, that is, on the longitudinal center line of the apparatus 25 which coincides with the draw bar 61 and extends midway between the center pins 41 of the loading station, is a stationary mold block 70 having a pair of mold halves or semi-cylindrical mold cavities 71 facing toward the opposite sides of the apparatus 25. Extending through the mold block 70 to communicate with each mold cavity 71 is an inlet passage 72 for molten or fluid plastic material. Fixed to the front of the stationary mold block 70 is an extruder head 73 having openings registering with the inlet passages 72. A plastic extruder 75 of a conventional type is connected to the extruder head 73 for the purpose of extruding molten plastic material into both mold cavities 71 simultaneously, when actuated.

Adapted to form the complete mold with each mold cavity 71 in the stationary mold block 70 is a movable mold block 77 having a complementary mold half or cavity 78 with vertically aligned top and bottom central pin slots 79 and 80 opening toward the fixed mold block 70.

The movable mold block 77 is fixed to a carrier 82. The carrier 82 is in turn fixed to a crosshead frame 83 adapted to be moved transversely of the apparatus 25 by a piston rod 84 actuated by a pneumatic cylinder 86 fixed to the side of the loader assembly frame 50. The crosshead frame 83 is guided for reciprocal transverse, translatory movement by a pair of guide rods 87.

Fixed to the bottom of the movable mold block 77 and opening downward are a pair of lower label suction cups 90, adapted to be evacuated through a vacuum line 91.

Mounted on the top of pintle 92, rotatably carried by the mold carrier 82, is the top label carrier arm 93. Fixed to the bottom of the carrier arm 93 are a pair of top label engaging suction cups 94 adapted to be evacuated through the vacuum line 95.

Figure 4:
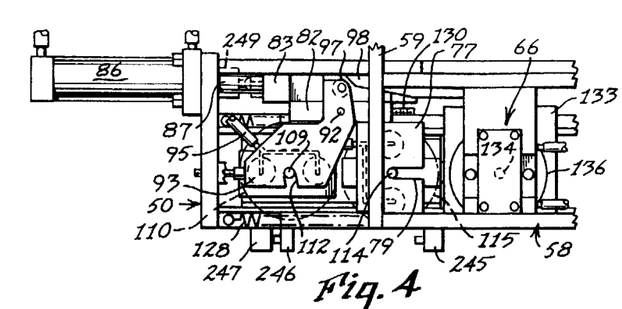
FIG. 4 is a fragmentary top plan view of the portion of the loader frame disclosed in FIG. 3.
Figure 6:
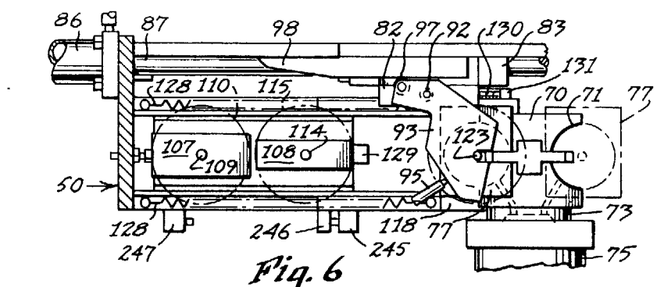
FIG. 6 is a fragmentary section taken along the line 6—6 of FIG. 5.

A cam follower 97 is mounted on the opposite end of the top label carrier arm 93 from the suction cups 94 to engage a cam bar 98 as the mold carrier 82 travels across the loader frame 50, as illustrated in FIGS. 4 and 6.

In its extreme retracted position, the piston rod 84 maintains the mold carrier 82 in its inoperative position in which the movable mold block 77 is completely withdrawn from the stationary mold block 70. Moreover, while the mold carrier 82 is in its inoperative position, the top label carrier arm 73 is in its top label loading position, as illustrated in FIGS. 1, 2, 3 and 4.

Figure 5:
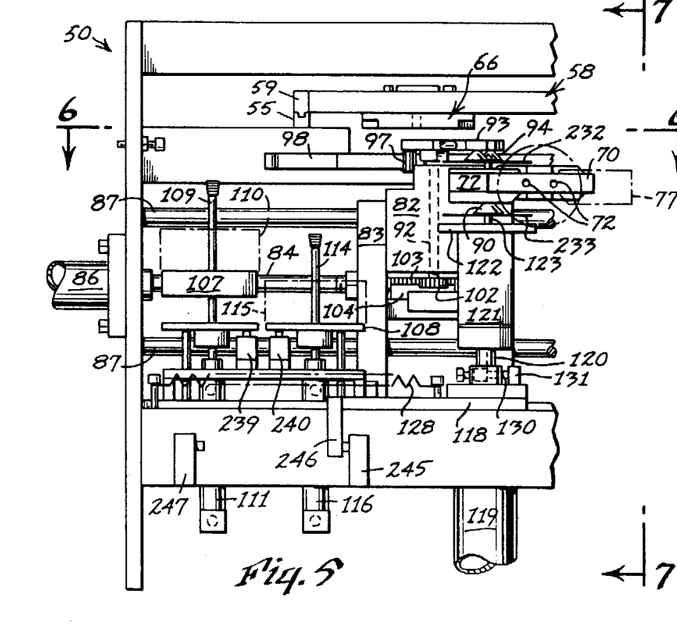
FIG. 5 is a fragmentary front elevation similar to FIG. 3, but disclosing the compressor carriage and movable mold carrier in molding position.

When the piston rod 84 is in its full protracted position, as illustrated in FIGS. 5 and 6, the mold carrier 82 has moved the mold block 77 into closed or molding position with the stationary block 70. As the mold carrier 82 travels from its inoperative to its molding position, the cam follower 97 engaging the cam bar 98 causes the top label carrier arm 93 to swing inward across the top of the movable mold block 77 so that a top label 100 carried by the suction cups 94 will be centered above the closed cavities 78 and 71 of the mold blocks 77 and 70.

In order to cause the top label carrier arm 93 to return to its original loading position when the piston rod 84 is retracted, the bottom of the pintle 92 is fixed to a gear 102 meshing with a rack 103 on a compression block 104. Between the left end of the compression block 104 and a portion of the crosshead frame 83 is located a spring 105 which is adapted to be compressed by the compression block 104 as the mold carrier 82 moves from left to right, that is, from retracted to molding position. Thus, upon the return traverse of the mold carrier 82, the energy stored in the compressed spring 105 is released to thrust the compression block 104 toward the right causing the rack 103 to turn the gear 102 in a direction to move the top label carrier arm 93 to its original loading position disclosed in FIG. 4.

When the mold carrier 82 is in its retracted inoperative position, the bottom label suction cups 90 are also in their loading position.

Located vertically below the top label suction cups 94 and the bottom label suction cups 90 are the top label elevator platform 107 and the bottom label platform 108, respectively. Fixed to the top label platform 107 is a piston rod 109 which projects through the platform 107 to receive thereover and upon the platform 107 a plurality of stacked top record labels 110. The top label piston rod 109 is reciprocably moved by the actuation of the pneumatic cylinder 111 fixed upon the loader frame 50. The top label carrier arm 93 is provided with a pin slot 112 through which the upper end of the piston rod 109 is adapted to reciprocate.

In a similar manner, a piston rod 114 is fixed to and projects above the bottom label platform 108 to receive thereover and upon the platform 108 a stack 115 of bottom labels. The piston rod 114 is reciprocably moved by the pneumatic cylinder 116, also fixed in the loader frame 50.

The upper ends of the piston rods 109 and 114 may be formed of finely threaded, frusto-conical tips to effect removal of all of the labels in the corresponding stacks 110 and 115, except the top label actually engaged by the suction cups 94 and 90, respectively, upon retraction of the piston rods 109 and 114.

It will be noted in the drawings, and particularly FIGS. 1 – 6, that the travel of the mold carrier 82 and movable mold block 77, extends from an inoperative position on the left side of the load carrier 66 in loading position to an operative molding position on the right side of the carrier 66. Moreover, the path of the mold block 77 extends beneath the load carrier 66 in loading position.

Mounted in the bottom portion of the loader frame 50 is the compressor carriage 118, for reciprocable movement transversely of the frame 50. Fixed to and depending from the compressor carriage 118 is a compression cylinder 119 in which is reciprocably carried a piston rod 120. Mounted on the upper end of the piston rod 120 is a hollow ram block 121 to the top of which is supported a ram head or compression plate 122. Coaxially carried within the ram block 121 and compression plate 122 is a reciprocable holding pin 123. The bottom of the holding pin 123 comprises a piston 124 slidable in the cylindrical cavity 125 and adapted to be protracted vertically upward by compressed air supplied to the bottom of the piston 124 in cavity 125 by the fluid line 126.

Figure 3:
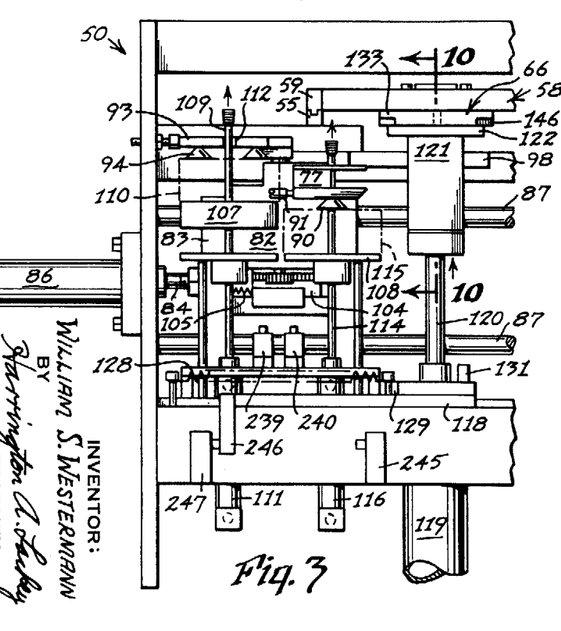
FIG. 3 is an enlarged, fragmentary front elevation of the upper left portion of the loading frame of the apparatus disclosed in FIG. 2.

The compressor carriage 118 is held in its retracted position, that is, a position in vertical alignment with the center of the load carrier 66 in loading position, as disclosed in FIGS. 1, 2, 3 and 4 by the retractable springs 128 against stop pins 129 projecting from a portion of the frame 50 (FIG. 3). As the mold carrier 82 moves toward its molding position, a push rod or pin 130 fixed to and projecting toward the right from the crosshead frame 83 engages a pusher block or arm 131 fixed to the compressor carriage 118 to move the compressor carriage 118 toward the fixed mold block 170 simultaneously with the mold carrier 82 (FIGS. 5 and 6). Thus, when the mold carrier 82 is fully protracted, the movable mold block 77 and the compressor carriage 118 have both been moved to molding position, in which the vertical axis of the ram block 121 and the holding pin 123 is coaxial with the center of the closed mold cavities 71 and 78, as disclosed in FIGS. 5, 6, 7 and 8.

As best disclosed in FIGS. 10, 11, 12 and 13, the load carrier 66 comprises a carrier block 133, through the center of which extends a fixed retaining pin 134. The retaining pin 134 depends below the bottom of the block 133 and has a recess in its bottom end for receiving the top end of the holding pin 123 in protracted position. Received in an annular rim 135 coaxially of the retaining pin 134 is an ejector plate or disc 136 having a hole through the center thereof for slidable movement relative to the retaining pin 134. The lower portion 137 of the retaining pin 134 forms a slight annular recess to facilitate gripping and holding plastic material compressed about it in a manner to be described later. Fixed to the top portion of the ejector disc 136 and projecting upward through corresponding openings in the carrier block 133 are four short rods 139 and 140. The rods 139 comprise piston rods supporting pistons 141 in corresponding air chambers 142 to which compressed air is supplied through the fluid lines 143 to force the ejector plate 136 down about the lower pin portion 137. The rods 140 have headed top ends providing shoulders for engaging leaf springs 145 which bias the spring rods 140, together with the ejector plate 136, upward when compressed air is exhausted from the chambers 142, thereby restoring the ejector plate 136 to a raised position.

The carrier block 133 may be provided with the diagonal slots 146 to permit a screw driver or other sharp-pointed instrument to be inserted to facilitate releasing the plastic material from within the annular rim or shaping chamber 135, if such is necessary.

The record holders 68 comprise a single piece of flat sheet material, such as sheet metal, 148 provided with semicircular recesses 149 surrounding, but spaced radially exteriorly of both pairs of dies 44 and 34, as best disclosed in FIG. 1. Formed on the edges of the recesses 149 are sets of vertically spaced flanges 150, each set being circumferentially spaced around the peripheries of the recesses 149. Holes 151 are formed in the plate 148 to receive the vertical lugs 35 when the record holder 68 is in the pressing station and when the lower platen 32 has been protracted upward into pressing relationship with the upper platen 31.

Extending slidably through the outer and middle sets of spaced flanges 150 are vertical pins 153, the bottoms of which are fixed to the respective slide bars 59 and 60 and draw bar 61. Between the upper headed end of each pin 153 and the top of the corresponding flanges 150 is a coil spring 154 to retain the record holder 68 normally flush against the tops of the bars 59, 60 and 61, yet to permit the upward movement of the plate 148 when the lower die 34 is forced upward into pressing position.

Mounted on the unloader frame 52 in longitudinal alignment with each center pin 41 of the loading station is punch mechanism 160, at what will hereinafter be referred to as an unloading station. Each punch mechanism 160 comprises a hollow anvil 161 having a vertical, central, cylindrical opening 162 therethrough, and adapted to receive coaxially on top thereof, a compressed phonograph record 164. Mounted above the anvil 161 and adapted to cooperate therewith is a cylindrical die punch 165. The exterior diameter of the punch 165 being slightly smaller than the interior diameter of the anvil opening 162 to permit insertion of the die punch 165 into the opening 162. The die punch 165 is provided at its lower portion with an annular recess 166, as best disclosed in FIG. 17. The die 165 is fixed to the bottom end of a piston rod 167 adapted to be reciprocated by the hydraulic cylinder 168 fixed in a stationary position upon the unloader frame 52.

A cylindrical stripper housing 169 having a cylindrical recess 170 opening at the bottom thereof is adapted to slidably receive the die punch 165. The upper wall of the recess 170 forms a shoulder 171 for engagement by the die 165 when retracted by the piston rod 167.

A bracket 172, having an opening 173 therethrough, is fixed to a portion of the unloader frame 52 between the hydraulic cylinder 168 and the punch 165. The opening 173 is large enough to receive not only the piston rod 167, but also the coil spring 175 around the piston rod 167. Depending from the bracket 172 are two rods 176 the bottoms of which comprise stop heads 177. Slidably supported upon the depending rods 176 between the stop heads 177 and the bracket 172 is a bearing plate 178 for the bottom end of the spring 175. Thus, upward movement of the piston rod 167 and die punch 165 causes the die punch 165 to engage the shoulders 171 of the stripper housing 169, not only carrying upward the stripper housing 169 but also the bearing plate 178 to compress the spring 175. When the piston rod 167 is protracted downward, the spring 175 uncoils downward pushing the bearing plate 178 down on top of the stripper housing 169 until the descent of the bearing plate 178 is arrested by the stop heads 177, to maintain the spring 175 partially compressed. Any further downward movement of the stripper housing 169 is produced only by gravity, until the stripper housing 169 rests upon the top of the record 164. Thus, the stripper housing 169 holds the record 164 in place while the die punch 165 cuts through the center of the record punching out the section 180 to form a neat circular spindle hole 181. The die punch 165 is designed to come to rest with the annular recess 166 coplanar with the record 164 so that the record 164 will be free to rotate around the annular recess 166 as a hub. The recess 166 also permits contraction of the rim of the spindle hole 181 as the plastic continues to cool after it has been pressed and punched.

Depending from the bottom of the die punch 165 is a centering punch pin 182.

The trimmer mechanism 185 includes a platform 186 pivotally mounted on a vertical pintle 187 to the unloader frame 52 for swinging about a vertical axis. The swinging movement of the platform 186 is effected through pneumatic cylinder 188 pivotally connected at one end to the frame 52 and adapted to reciprocably move the piston rod 189 which is connected by pin 190 to the platform 186 (FIGS. 1 and 16).

Mounted on the platform 186 is an electric motor 192 adapted to drive through the reduction transmission 193 a gear train 194, which in turn are adapted to drive in opposite directions upper and lower cutter shaft collars 195 and 196. Keyed and fixed by a set screw, not shown, in the upper collar 195 is the upper cutter shaft 197 journaled in the bearing 198 and carrying at its free end, the rotary cutter disc or knife 199.

Keyed, but not fixed, for slidable movement within the lower collar 196 is the lower cutter shaft 200, also journaled in the bearing 198 and carrying at its free end the outer cutter disc 201 and the inner cutter disc 202. The outer cutter disc 201 is biased into frictional and overlapping engagement with the upper cutter disc 199 by spring 203 coiled around the lower shaft 200, and bearing against the lower collar 196, as disclosed in FIG. 1.

Figures 16, 18, 19:
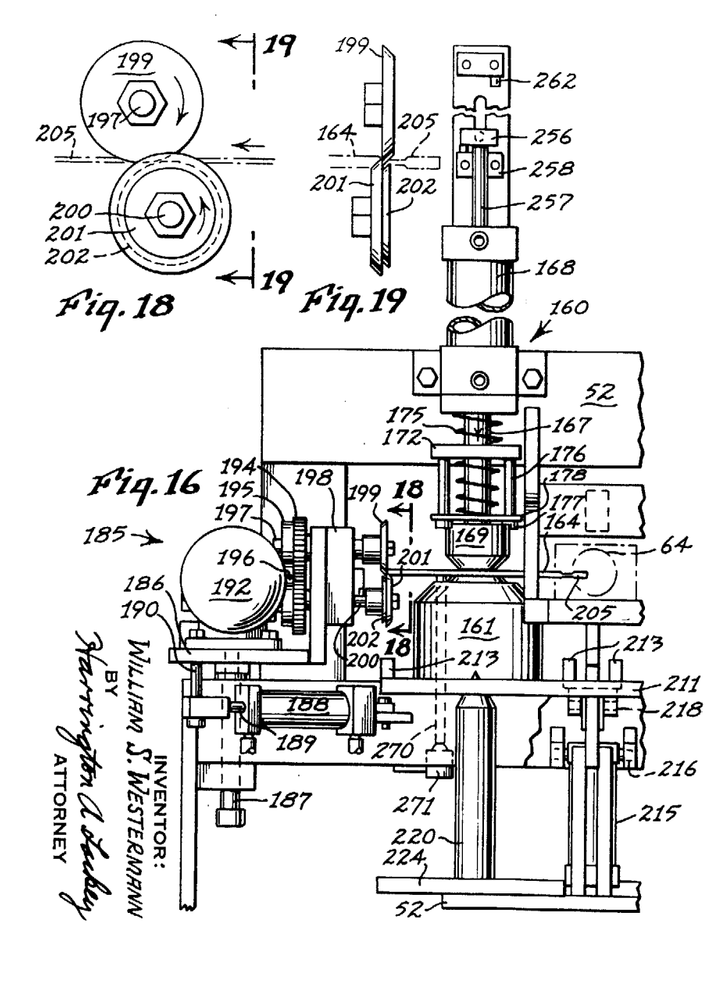
FIG. 16 is a fragmentary rear elevation of the right-hand portion of the apparatus, as viewed in FIG. 1.
FIG. 18 is an enlarged section taken along the line 18—18 of FIG. 16.
FIG. 19 is a section taken along the line 19—19 of FIG. 18.

As best disclosed in FIG. 19, the inner knife disc 202 is fixed and coaxial relative to the outer lower knife disc 201, although of slightly less diameter. The inner rotary disc 202 is also substantially coplanar with the upper disc 199 and diametrically slightly spaced apart to permit the peripheries of the two cutter discs 199 and 202 to grip the flashing 205 extending from the record 164 with sufficient friction to pull the flashing and thereby rotate the record 164 while simultaneously severing the flashing 205 from the record 164.

The record removal mechanism 210 comprises an open frame 211 pivotally mounted by hinge pin 212 to the unloader frame 52. The frame 211 includes a pair of parallel forwardly projecting slide rails 213 for each unloading station. A pair of slide rails or arms 213 are spaced apart on opposite sides of the punch anvil 161 and in normal inoperative position disposed substantially parallel below the plane of the record 164 in unloading position. The frame 211 is swung to an upward sloping operative position, as best disclosed in FIG. 20, by means of a pneumatic cylinder 215 pivotally supported upon the loader frame 52 by pivot pin 216 and adapted to reciprocate the piston rod 217, the upper end of which is connected by pivotal coupling 218 to the frame 211. The guide rails 213 terminate at their rear ends in opposed slots 219, the distance between opposed slots 219 being slightly greater than the diameter of the completed record 164, so that when the rails 213 are inclined as disclosed in FIG. 20, the record will drop by gravity through the slots 219. As each record 164 falls from the frame 211, as best disclosed in FIG. 20, it is automatically centered so that the spindle hole 181 automatically registers with an upstanding depository pin 220. The deposited records 164 then come to rest in a stack 222 upon a depository platform 224. The platform 224 and depository pin 220 will also be referred to as a deposit station.

In the operation of the apparatus 25, a stack 110 of upper record labels are deposited upon the upstanding piston rod 109 so that the stack 110 comes to rest upon the elevator platform 107, and another stack 115 of lower record labels is deposited over the upstanding piston rod 114 until the stack 115 comes to rest upon the elevator platform 108. A start button, not shown, is pushed to start the control elements in the control cabinet 230 to carry out the operations of all the elements in the apparatus 25 until the final stack of completed records 222 is deposited upon the platform 224. This stack of records 222 is then removed from the depository pin 220 for packaging, storage and/or shipment. The depositing of the labels and the removal of the records are substantially the only operations not automatically performed by the apparatus 25.

The control elements incorporated in the cabinet 230 are conventional purchased parts, and may be connected together in various electrical or electronic circuit arrangements to carry out the proper sequence of operation. Such control elements may include stepping switches, relays, time-delay relays, synchronous motor timers, solenoid operated air valves, air-piloted hydraulic valves, switches, fuses and microswitches, some of which are disclosed and will be described in connection with the operation of the machine.

FIG. 1 discloses the major elements of the machine in their initial positions. The carrier frame 58 is protracted to its extreme forward position, placing the load carrier 66 in the loading station. The protracted position of the carrier frame 58 automatically places the record holder 68 in the pressing station.

FIGS. 1, 2, 3 and 4 also disclose the major elements of the loader frame 50 in their initial positions. The mold carrier 82 is in its retracted inoperative position with the top label carrier arm 93 and its suction cups 94, and the lower label suction cups 90, in their label loading positions. The compressor carriage 118 is in its fully retracted position with the ram block 121, compression plate 122 and holding pin 123, not only in vertical alignment with the load carrier 66, but also in their lowermost inoperative positions. Both label elevator platforms 107 and 108 are in their lowermost positions for receiving thereon the respective label stacks 110 and 115.

Upon starting or energization of the control circuit within the housing 230, pneumatic cylinders 111, 116 and 119 are simultaneously actuated to protract the label piston rods 109 and 114 and ram rod 120. Thus, the elevator platforms 107 and 108 carry the label stacks 110 and 115 upward simultaneously until the top label 232 and 233 on each stack is engaged by the respective suctions cups 94 and 90, in which vacuum has been created. The compression operation of the ram block 121 will be described later in connection with its second upward cycle. The completion of the first step, that is, engagement of the top labels by the respective suction cups 94 and 90, as well as the upper extreme travel of the ram block 121 is detected by the engagement of upper microswitch 235 by switch lug 236 carried on a rod 237 depending from and moving with the piston, not shown, traveling within the compressor cylinder 119. The actuated microswitch 235 signals the termination of the first step in the operational sequence effected by controls within the control housing 230.

The second step is initiated by a signal from the controls for the press heads 27 and 28, when the lower press head 28 is in condition for descent. During the second step, the ram block 121 and the label elevators 107 and 108 are retracted. As the label elevators 107 and 108 descend, the top labels 232 and 233 remain engaged by their respective suction cups 94 and 90. Completion of step two is detected by microswitches 239 and 240 engaged by the supporting frames of the label elevators 107 and 108 in their lowermost positions, and by actuation of the microswitch 141 by the lug 236.

Actuation of the switches 239, 240 and 241 commences the third step, which includes actuation of the pneumatic cylinder 86 to protract the cross head frame 83 supporting the mold carrier 82. As the mold carrier 82 moves the mold block 77 toward the stationary mold block 70, the top label carrier arm 83 swings across the top of, and in vertical alignment with, the movable mold block 77, as disclosed in FIGS. 5 and 6.

Also, as the mold carrier 82 is protracted toward molding position, it engages, through push pin 130 and block 131, and pushes the compressor carriage frame 118 simultaneously toward the fixed mold block 70. During the protracted movement of the mold carrier 82, the mold block 77 is carrying, through the suction cups 94 and 90, the upper and lower record labels 232 and 233 already in coaxial alignment with the center of the mold cavity 78. In its extreme protracted position, the movable mold block 77 engages the fixed mold block 70 to close the mold cavities 78 and 71 to form a complete mold having a vertical axis in alignment, not only with the center of the upper and lower record labels 232 and 233, but also with the holding pin 123. Completion of the third step is detected by engagement of the microswitch 245 by switch arm 246 depending from the compressor carriage 118.

Actuation of the microswitch 245 commences the fourth step which causes the introduction of compressed air through the fluid line 126 to force piston 124 and holding pin 123 upward in the ram block 121 to penetrate the center of the lower label 233, pin slots 80 and 79, and the upper record label 232, as best disclosed in FIGS. 5, 6, 7 and 8.

Also during step four, the extruder 75 begins discharging hot fluid plastic through the discharge head 73, and inlets 72 to fill the mating mold cavities 71 and 78 with a predetermined amount of plastic record material. The proper amount of plastic material is controlled by a timer mechanism, not shown, within the control housing 230. The timing mechanism also provides for a partial cooling period of several seconds after the termination of the discharge of plastic material.

The timer mechanism also initiates the fifth step in the operation by cutting off the vacuum to the suction cups 94 and 90 to leave the upper labels 232 and lower label 233 suspended upon the holding pin 123, as best disclosed in FIGS. 5, 7 and 8. The molded mass 250 of plastic material formed in the mold cavities 71 and 78 also adheres to the holding pin 123.

Also during the fifth step, each cylinder 86 is actuated to retract the crosshead frame 83 and mold carrier 82, followed by the compressor carriage 118 by virtue of the retractable springs 128. As the movable mold block 77 and holding pin 123 begin moving away from the fixed mold block 70, the plastic mass 250, adhering to the holding pin 123 and the movable mold cavity 78, is separated from the stationary mold cavity 71.

After the compressor carriage 118 has moved to its retracted position abutting the stops 129, the holding pin 123 is vertically aligned beneath the load carrier 66. However, the mold carrier 82 continues to move toward the left of FIGS. 2 – 6, thereby separating the movable mold cavity 78 from the plastic mass 250, so that the plastic mass 250, and upper and lower labels 232 and 233, remain adhered to the holding pin 123, as fully disclosed in FIG. 9. The mold carrier 82 continues to retract to its inoperative position where the lower label suction cups 90 are in position for receiving the next lower label. Also in the inoperative position of the mold carrier 82, the top label carrier arm 93 has again been swung to its loading position away from the movable mold 77 by virtue of the release of the compressor spring 105 expanding against the spring block 104.

Completion of the fifth step is detected by engagement of the switch arm 246 with the left microswitch 247, and also by engagement of a portion of the crosshead frame 83 with microswitch 249 beneath cylinder 86 (FIG. 4).

Actuation of the switches 247 and 249 commences repetition of the first step. As best disclosed in FIG. 10, the ram block 121 is carried upward by the compressor piston rod 120 until the top end of the holding pin 123 engages the recessed bottom end of the retaining pin 134 in the load carrier 66. The holding pin 123 remains stationary relative to the retaining pin 134, as the ram block 121 and compressor plate 122 continue to move upward and compress the upper label 232, plastic mass 250 and lower label 233, not only against each other, but also against the ejector plate 136 in the bottom of the load carrier 66, to produce a flat composite unit 252.

When the second step is repeated, the ram block 121 will retract downward, the fluid line 126 is exhausted, and the composite unit 252 remains behind secured upon the retaining pin 134 in the load carrier 66. Since the holding pin 123 has already been depressed by the ejector plate 136, it remains depressed during the entire second step.

After the completion of step two in the loading cycle, and when the hydraulic press ram 29 has retracted the lower press head 28 to its lowermost position detected by engagement with the microswitch 45, a signal is transmitted to the control system in the housing 230 to actuate the carrier cylinder 64 to retract the carrier frame 58. Full retraction of the carrier cylinder 64 places the load carrier 66 in the pressing station and the record holder 68 in the punching station, as disclosed in FIG. 12, and causes switch arm 254 on draw bar coupling 62 to actuate microswitch 255.

As best disclosed in FIGS. 9 and 10, the rear edge of the compressor plate 122 slopes upward slightly to similarly shape the rear edge portion of the composite unit 252 to raise the rear edge of the lower label 233. Thus the rear edge of the lower label 233 is prevented from snagging on the die center pin 41 during retraction and from curling under the composite unit 252.

Figures 12, 13:
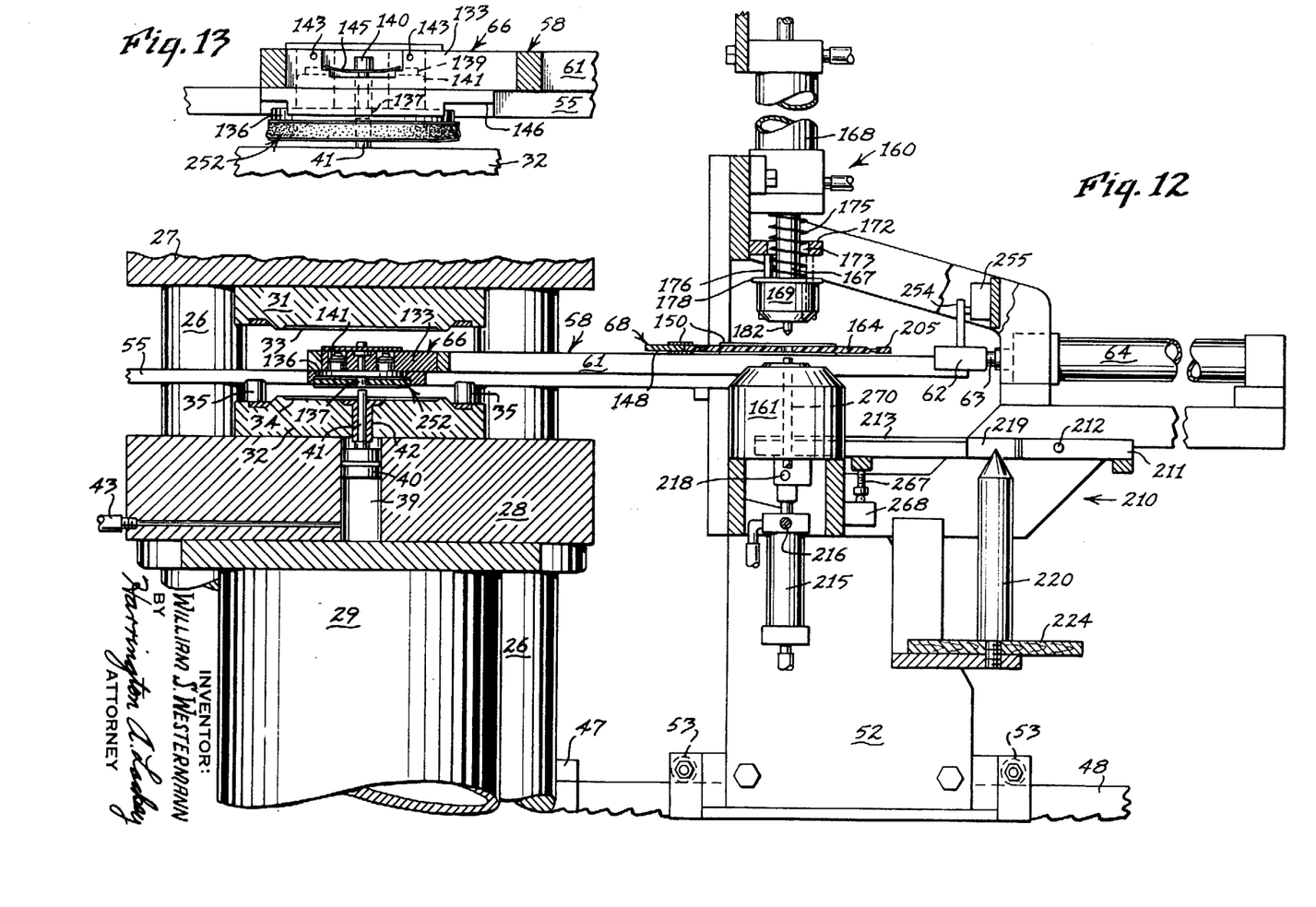
FIG. 12 is an enlarged, fragmentary section taken along the line 12—12 of FIG. 1, but disclosing the carrier frame in retracted position.
FIG. 13 is an enlarged, fragmentary sectional elevation of the load carrier in ejecting position.

Actuation of microswitch 255 energizes the controls within housing 230 to supply compressed air through the fluid lines 143 to force down the piston rods 139 causing the ejector plate 136 to strip the composite unit 252 from the retaining pin 134 and deposit the composite unit 252 upon the die center pin 41, as best disclosed in FIG. 13. Upon elimination of the air pressure from the piston chambers 142, the leaf springs 145 bias the spring rods 140 upward to retract the ejector plate 136 to an inoperative position above the composite unit 252 and center pin 41. Simultaneously with the stripping of the composite unit 252 from the load carrier 66, the punching mechanism 160 is effecting a punching operation, which will be described later.

The termination of the stripping and punching operation is detected by engagement of switch lug 256, mounted on rod 257 movable with the piston in the punch cylinder 168, with lower microswitch 258, as best disclosed in FIG. 16. Actuation of the switch 258 causes the carrier cylinder 64 to protract the load carrier 66 to its original loading position and the record holder 68 to the pressing station. An actuator pin 261 on the protracted carrier frame 58 actuates stationary micro-switch 260 (FIG. 1).

The lower press head 28 is then forced upward by the ram 29. The composite record unit 252 centered on the pin 41 is also engaged and forced upward by the lower die 34 into pressing engagement with the upper die 33. As the record 164 is formed from the composite unit 252 in the pressing station, the excess plastic material is squeezed between the rims of the dies to form the flashing 205, which is extruded into the spaced vertical gripping flanges 150 on the record holder 68.

As best disclosed in FIG. 15, the record holder 68 is actually lifted with the lower platen 32 above the slide bars 59 and 60. The holes 151 in holder plate 148 permit clearance of the lugs 35 as the lower platen 32 rises.

After the pressing operation, the lower press head 28 descends to separate the lower die 34 from the newly formed record 164. The spring biased retainer pins 153 also assist in separating the plate 148, and consequently the newly formed record 164, from the upper die 33. Thus, the newly formed record 164 is suspended solely by the flanges 150 of the record holder 68 in the pressing station, and preparatory to retraction to the punching station.

After the record holder 68 is retracted to the unloading station, the punch cylinder 168 is actuated to protract the die punch 165 to punch out the section 180, as previously described. Also as previously described, the die punch 165 remains in the protracted position disclosed in FIG. 17 with annular recess 166 acting as a center bearing for the spindle hole 181 in the record 164, and also retaining the record 164 between the top of the anvil 161 and the bottom of the stripper housing 169. Thus, when the record holder 68 protracts, the stripping flanges 150 are easily pulled loose from the flashing 205.

As best disclosed in FIG. 16, record 164 depresses the aluminum rod 270, vertically and reciprocably mounted in anvil 161, to actuate micro-switch 271. The micro-switch 271 is connected to lower micro-switch 258 and to controls in the housing 230 in such a manner that the entire apparatus 25 will cease operating when micro-switch 258 is actuated by lug 256 and a record 164 is absent from the unloading station. When a record 164 is not resting on the anvil 161, the rod 270 will remain elevated by the spring, not shown, in the micro-switch 271.

Figures 17, 20, 21:
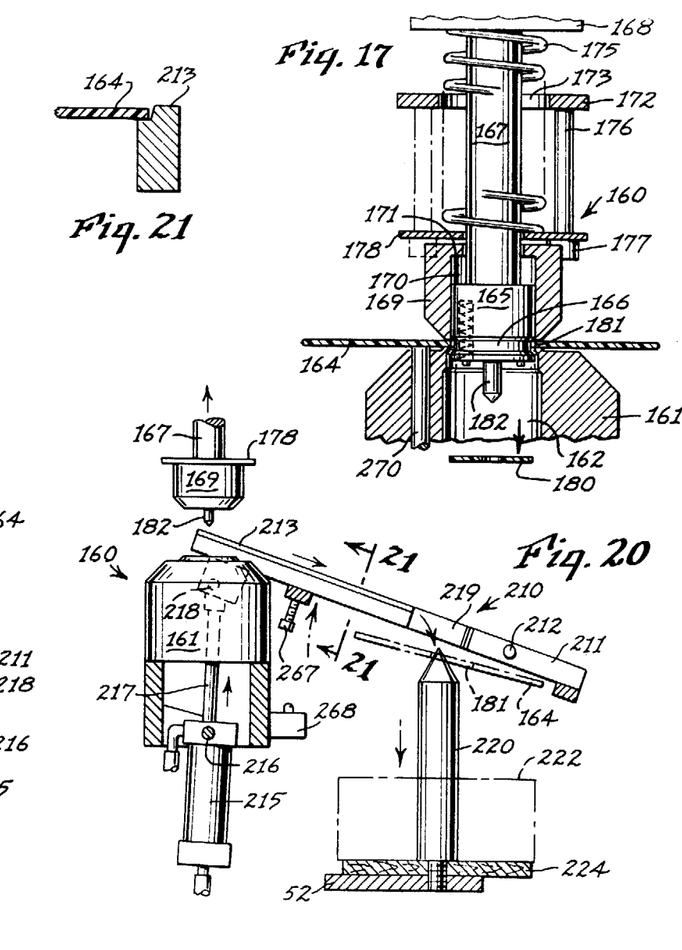
FIG. 17 is an enlarged, fragmentary sectional elevation of the punch mechanism in operative position at the unloading station.
FIG. 20 is a schematic sectional elevation of the punch mechanism, and the record removal mechanism in operative position.
FIG. 21 is an enlarged section taken along the line 21—21 of FIG. 20.

While the record 164 is held in the unloading station by the punching mechanism 160 in its protracted position, as best disclosed in FIG. 17, the pneumatic cylinder 188 is actuated to swing the trimmer mechanism 185 from its inoperative phantom position, disclosed in FIG. 1, to the solid-line position, disclosed in FIGS. 1 and 16. The electric motor 192 is energized to drive the cutter discs 199, 201 and 202. As previously described the discs 199, 201 and 202 not only sever the flashing 205 from the perimeter of the newly formed record 164, but also rotate the record 164 about the die punch 165. In this manner, no other force or driven device is required to rotate the record 164 while it is being trimmed.

The operation of the trimmer mechanism 185 is controlled by a timer device, not shown, in the control housing 230. Simultaneously with the termination of the trimming operation, the hydraulic punch cylinder 168 is actuated to retract the die punch 165 within the stripper housing 169 to strip the record 164 and deposit it upon the anvil 161. The record 164 is stripped from the die punch 65 as the punch ascends into the housing recess 170 while the housing 169 is held down by the partially compressed spring 175. Continued retraction of the die punch 165 also raises the stripper housing 169 and bearing plate 178 to compress the coil spring 175, as previously described. At the upper limit of retraction of the punch piston rod 167, the switch lug 256 engages and actuates the micro-switch 262. Simultaneously, the trimmer mechanism 185 is swung by the trimmer cylinder 188 to its outward inoperative position to actuate the micro-switch 264 against stationary actuator pin 265 (FIG. 1).

Actuation of the upper micro-switch 262 and the trimmer micro-switch 264 energizes controls in housing 230 to actuate the cylinder 215 to elevate the record removal mechanism 210, removing the record 164 from the die anvil 161, and transferring the record 164 to drop over pin 220 upon the depository platform 224, as shown in FIG. 20, and as previously described. The actuation of the record removal cylinder 214 is controlled by another timer mechanism in the control housing 230, which, at the termination of a predetermined period, restores the record removal frame 211 to its original inoperative position, as disclosed in FIG. 12, in which position the actuator pin 267 on the frame 211 engages and actuates micro-switch 268 fixed to the unloader frame 52, to create a signal initiating the next sequence step.

It will be noted that all the duplicate parts of the apparatus 25 bear identical reference numerals, and all duplicate elements operate simultaneously.

It is also noted that certain functions of the machine are carried out simultaneously in order to reduce the production time. For example, the compression of the plastic mass 250 and labels 232 and 233 upon the load carrier 66 is carried out simultaneously with the loading of top and bottom labels upon the suction cups 94 and 90 and substantially simultaneously with the pressing of a record 164 at the pressing station. Moreover, when the composite unit 252 is removed and deposited at the pressing station, the record 164 is being punched at the unloading station.

Also, as disclosed in FIG. 1, the record 164 is being trimmed at the same time that another record is being pressed in the pressing station, and a composite unit 252 is being formed and loaded at the loading station in the load frame 50.

Although various combinations of control elements, as well as various specific control elements, can be employed in carrying out the operation of the apparatus 25, nevertheless, it is the arrangement and construction of the various mechanical elements which permit such effective and efficient functioning of the control elements to carry out the simultaneous steps and in the sequence which has been described.

I claim:

1. A phonograph record making apparatus comprising:
    a. a record pressing station including relatively movable upper and lower record pressing dies,
    b. load carrier means,
    c. transfer means for moving said carrier means between said pressing station and a loading station remote from said pressing station,
    d. a mold comprising a stationary mold cavity, a horizontally movable mold cavity, and extruder means for discharging plastic record material between said mold cavities in molding position to form a mass,
    e. a mold carrier supporting said movable mold cavity for movement between said molding position and an inoperative position,
    f. a compressor carriage movable between said molding position and said loading station,
    g. a compression plate mounted for vertical reciprocal movement on said compressor carriage,
    h. a holding pin mounted in said compression plate for vertical reciprocal movement relative to said compression plate,
    i. label positioning means for positioning a bottom label below and an upper label above said mold cavities in coaxial alignment in said molding position,
    j. motive means for moving said holding pin upward between said mold cavities in molding position to coaxially penetrate said labels and receive said plastic mass,
    k. means for moving said mold carrier toward and away from said molding position,
    l. means for moving said compressor carriage away from said molding position to said loading station in which said holding pin, supporting said labels and said mass, is vertically aligned with said load carrier means, and
    m. means for moving said compression plate upward to compress said labels and mass against said load carrier means into a composite unit for adherence to said load carrier means, and to remove said composite unit from said holding pin.

2. The invention according to claim 1 further comprising means on said load carrier means for stopping the upward movement of said holding pin while said compression plate is moving upward, thereby stripping said labels and mass from said holding pin.

3. The invention according to claim 1 in which said compressor carriage is movable between said mold carrier and said molding position, said mold carrier being movable away from said compressor carriage in said loading station to separate said movable mold cavity from said mass on said holding pin.

4. The invention according to claim 1 further comprising positive motor means for moving said mold carrier reciprocably in both directions between said molding position and said inoperative position, said compressor carriage being moved toward said molding position by the motion of said mold carrier, and retractable means moving said compressor carriage from said molding position to said loading station as said mold carrier moves toward its inoperative position.

5. The invention according to claim 1 in which said label positioning means comprises an upper label positioning means mounted on said mold carrier for swinging movement between a label receiving position laterally of said movable mold cavity and an operative position coaxially above said movable mold cavity, and means for swinging said upper label positioning means from said receiving position to said operative position as said mold carrier moves toward said molding position.

6. The invention according to claim 5 in which said label positioning means further comprises lower label positioning means fixed on the bottom of said movable mold cavity.

7. The invention according to claim 6 in which said upper and lower label positioning means comprise upper and lower suction gripping means, an upper receiving means for an upper label stack and means for moving said upper receiving means upward for engagement of said upper label stack with said upper gripping means in label receiving position, a lower receiving means for a lower label stack, and means for moving said lower receiving means upward for engagement of said lower label stack with said lower gripping means when said movable die cavity is in said inoperative position, and means for actuating said suction gripping means to release said labels in said molding position after said labels have been penetrated by said holding pin.

* * * * *